S. ROCHLIS.
ASH CART COVER.
APPLICATION FILED AUG. 23, 1917.
1,294,708.
Patented Feb. 18, 1919.
2 SHEETS—SHEET 1.
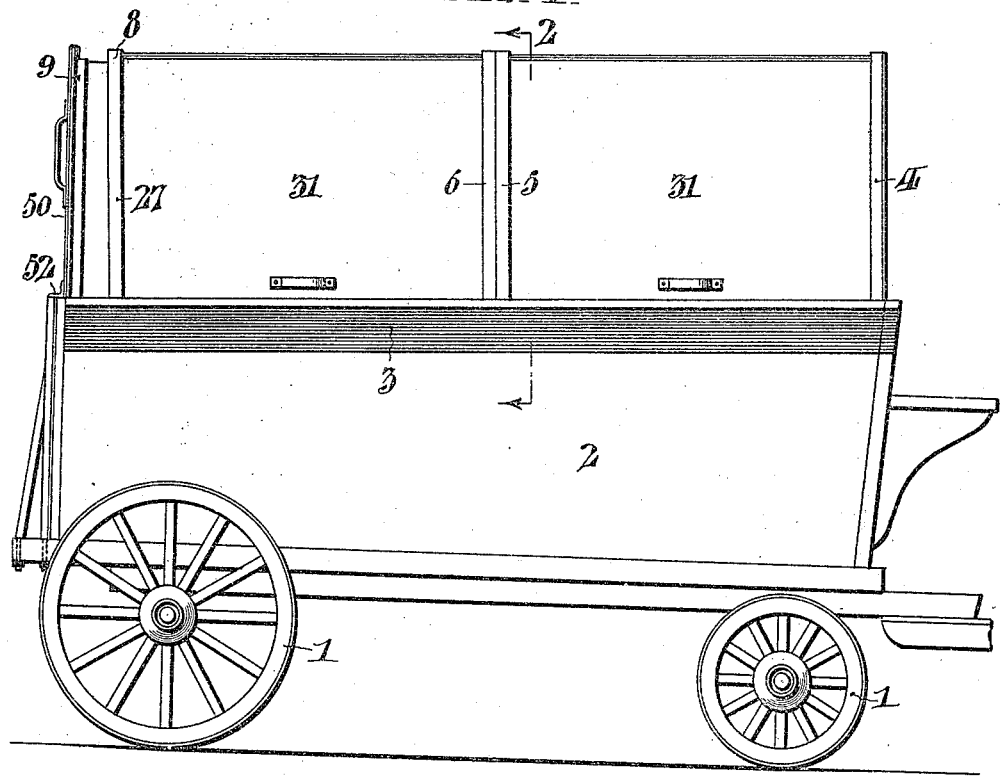
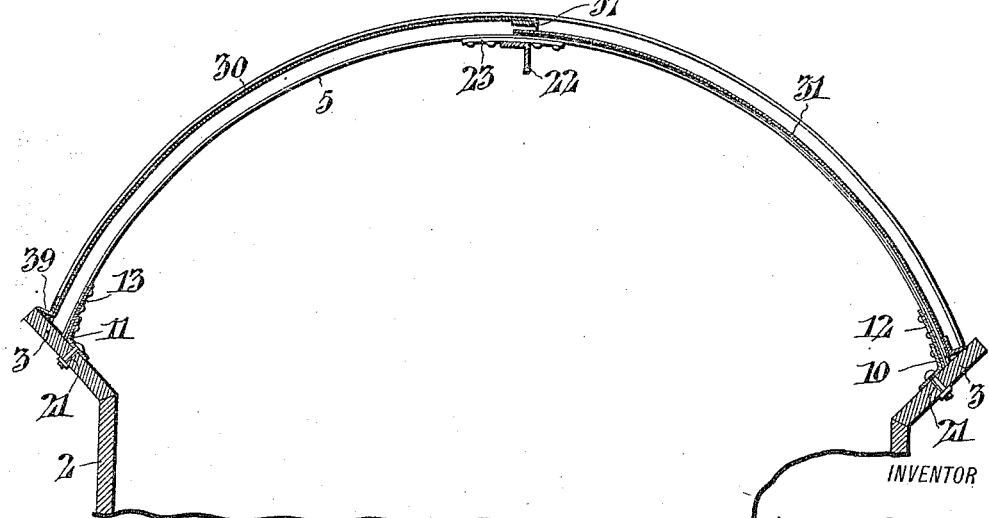
INVENTOR
Samuel Rochlis
By
Cyrus N. Anderson
ATTORNEY

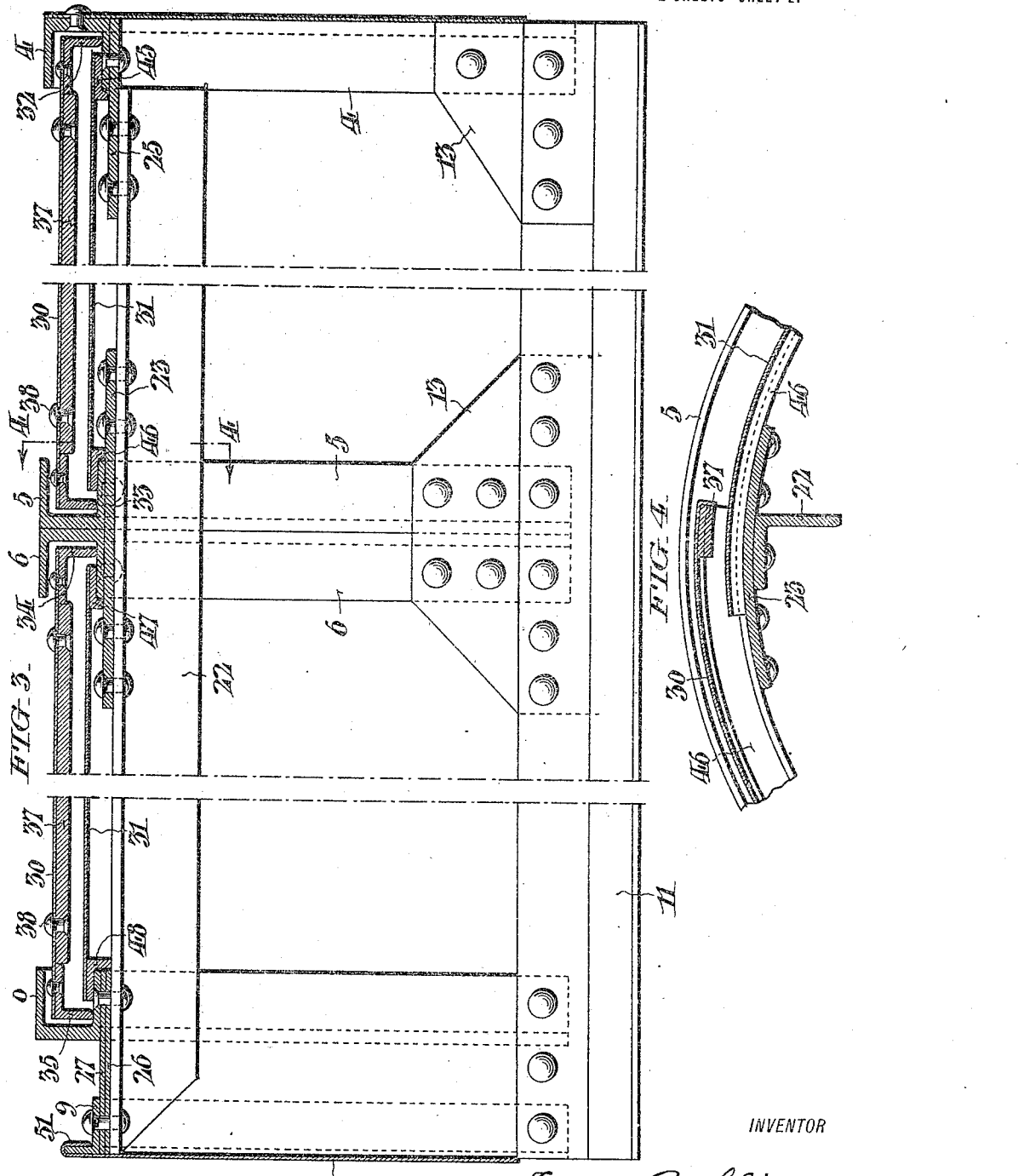

UNITED STATES PATENT OFFICE.

SAMUEL ROCHLIS, OF PHILADELPHIA, PENNSYLVANIA.

ASH-CART COVER.

1,294,708.  Specification of Letters Patent.  Patented Feb. 18, 1919.

Application filed August 23, 1917. Serial No. 187,770.

*To all whom it may concern:*

Be it known that I, SAMUEL ROCHLIS, a citizen of the United States, residing in the city of Philadelphia, county of Philadelphia, State of Pennsylvania, have invented certain new and useful Improvements in Ash-Cart Covers, of which the following is a specification.

My invention relates to covers for ash and similar carts and it has for its objects to provide a construction of cover which may be readily applied or attached to the tops of the bodies of ash and similar carts already constructed and in use or as at present being constructed; also to provide a cover having portions thereof movable relative to other portions to provide openings through which ashes or other material may be thrown in the loading of the cart therewith, said portions being so supported that they may be moved easily relatively to each other and the said portions being strongly supported on the elements or parts of a light but strong frame structure rigidly and stationarily secured to the body of the cart; and also to provide a cover of relatively light and simple construction which may be cheaply and economically manufactured.

Other objects and advantages of my invention will be referred to and pointed out in the detail description thereof or will be apparent from such description.

In order that my invention may be readily understood and its practical and commercial advantages more fully appreciated and comprehended reference may be had to the accompanying drawings in which I have illustrated one form of a convenient embodiment thereof.

In the drawings:—

Figure 1 is a side elevation of a wagon or cart provided with a cover constructed in accordance with my invention;

Fig. 2 is a transverse sectional view taken on the line 2—2 of Fig. 1, through the cover and the upper portion of the opposite sides of the cart or wagon body;

Fig. 3 is a central horizontal sectional view of the cover; and

Fig. 4 is a transverse sectional view taken on the line 4—4 of Fig. 3.

Referring to the drawings, 1 designates the wheels of an ash cart or wagon and 2 the body thereof having outwardly flared portions 3 at the upper edges of the sides thereof, as is quite usually the case.

4 designates a channel member situated at the front end of the cover and having its flanges extending toward the rear as shown in the drawings. 5 and 6 designate channel members situated at or near the center of the length of the cover, said channels being arranged back to back and preferably secured together by rivets extending through said backs. The flanges of the channel member 5 extend toward the front of the cover and those of the member 6 extend toward the rear thereof. 8 designates a channel member situated near the rear end of the cover, the flanges of which extend toward the front of said cover. 9 designates an angle-iron situated at the rear end of the cover. All of these channels and angle-iron 9 are of bow shape and their opposite respective ends are connected to the upwardly extending flanges of angle-irons 10 and 11 by means of rivets or in any other suitable preferred manner. In order to strengthen the connections between the ends of the channel members 4, 5 and 6 and the said angle-irons 10 and 11 gusset-plates 12 and 13 are provided.

The downwardly inclined or extended flanges of the angle irons 10 and 11 are adapted to be secured by means of screw bolts 21 or by other means to the outwardly flared portions 3 of the sides of the body 2.

22 designates an angle iron, or an equivalent member, which is situated at the top or apex of the frame of the cover, and is secured by means of rivets to the channel members 5 and 6 and to the gusset-plate 23 interposed between the said channels and the top horizontally extending flange of the said angle-iron. The said angle-iron 22 extends to the rear end of the cover and is connected to the lower flange of the channel 8 and to the forwardly extending flange of the angle-iron 9 by means of rivets in known manner. The said angle-iron 22 terminates a short distance in rear of the front end of the cover and is connected by means of rivets to a gusset-plate 25 which is extended to the front end of the cover and is connected by rivets to the lower rearwardly extending flange of the channel 4. 26 and 27 designate curved or bent plates for covering or closing the space between the channel 8 and the angle-iron 9. The inner ends of these plates are overlapped as shown in Fig. 3. The said overlapped ends are secured together and to the channel member 8 and angle-iron 9 by the rivets heretofore mentioned for securing the angle-iron 22 to the said channel member and angle-iron. The outer opposite lower ends of the plates 26 and 27 are secured to the upwardly extending flanges of the angle-irons 10 and 11 and to the opposite ends of the channel member 8 and the angle-iron 9 and serve to strengthen the connection between the ends of said channel member and angle-iron and the angle-irons 10 and 11.

The spaces between the front and rear channel members 4 and 8 and the intermediate channel members 5 and 6 are respectively closed by means of relatively movable bent or curved plate members respectively slidably supported at their front and rear edges upon the bottom flanges of the said channel members. Each of the said spaces is covered by two relatively movable curved slidable plates, the plates covering the two said spaces being of like construction and supported in like manner. In each of the spaces, 30 designates a top plate and 31 designates a lower plate. Normally when the plates are in closed condition or arrangement they occupy the positions shown in Fig. 2 of the drawings in which positions their inner upper edges which extend longitudinally of the cart or wagon body overlap each other so as to completely close the said space. Each of the plates 30 is provided with angle-irons at its front and rear edges. The angle-irons at the front and rear edges of the front plate 30 are designated by the reference numbers 32 and 33 respectively, while those upon the front and rear edges of the rear plate 30 are designated by the numbers 34 and 35 respectively. The bottom edges of the vertical flanges of the angle-irons 32 and 33 rest upon the bottom flanges of the channel members 4 and 5 at points adjacent to the webs thereof, while the bottom edges of the vertical flanges 34 and 35 rest upon the bottom flanges of the channel members 6 and 8.

For the purpose of strengthening and stiffening the inner upper edges of the plates 30 I have provided stiffening bars 37 which are secured to the underneath sides of the upper edge portions of the said plates by means of rivets 38. These stiffening and strengthening bars are situated intermediate the plates 30 and the plates 31. The outer lower edges of the plates 30 are each provided with stiffening and strengthening angle-irons 39 secured thereto, said angle-irons terminating at points just inside of the flanges of the opposing channel members.

The front lower plate 31 is provided at its front edge with an angle-iron 45 and at its rear edge with an angle-iron 46. The under side of the forwardly and rearwardly extending flanges of these angle-irons rest upon the bottom flanges of the channel members 4 and 5 respectively inside of the vertical flanges of the angle-irons 32 and 33. The rear plate 31 is provided with similar angle-irons 47 and 48, the forwardly and rearwardly extending flanges of which rest upon the bottom flanges of the channel members 6 and 8 inside of the vertical flanges of the angle-irons 34 and 35.

The plates 30 and 31 for closing the two spaces above referred to are slidable with respect to each other transversely of the cover. Either of the plates 30 or 31 covering either space may be moved by sliding it along its supports to the opposite side of the cover from that which it normally occupies, in which position the top plate 30 will completely overlie or cover the underneath plate 31. When so positioned one side or the other of the space in which the covers have been so adjusted or moved with respect to each other will be completely or entirely opened, the other side being closed.

Instead of moving either the plate 30 or 31 entirely to one side or the other of the space covered thereby each plate may be adjusted or moved toward the center to occupy intermediate positions with respect to the said space so that openings may be provided upon opposite sides if desired.

The rear open end of the cover is adapted to be closed by means of a removable plate 50 of the shape necessary to close the said end. The upper curved edge of said plate is provided with a portion 51 bent as shown in Fig. 3 to form a hook-like part which is adapted to be hooked over the upwardly extending vertical flange of the angle-iron 9. The lower edge of said plate 50 is held in place by the angle-iron 52 secured to the top edge of the end of the body 21. It is obvious that the said plate may be removed readily by lifting it so as to disengage the upper edge thereof from the said angle-iron 9. It is desirable that the said plate 50 should be readily removed so that when it is desired to discharge the load or contents from the body by tilting it toward the rear the said closing plate may be removed to permit free and complete discharge of the said load.

By constructing the frame of the cover independently of the body and attaching it to the latter as a separate and independent structure it is apparent that the same cover may be fitted to bodies of somewhat different widths and also that it is not necessary for the construction either of the body or the frame of the cover to be accurate as to width in order to enable the attachment of the opposite edges of the frame of the cover to the upwardly and outwardly flaring portions of the sides of said body. The parts 4, 5, 6, 8, 10, 11 and 22 constitute a skeleton frame for supporting the cover plates 30 and 31 of the cover.

I claim:—

1. In a cart or wagon cover, the combination of front and rear bowed members provided with rearwardly and forwardly extending flanges, an intermediate bowed supporting member provided with flanges respectively extending toward the front and rear of the cover, means for connecting the said bowed members together at their centers and at their opposite ends to form a frame structure, the opposite sides of the said frame structure being adapted to be secured to and supported upon the upper edge portions of the opposite sides of the body of a cart or wagon, means for closing and opening each of the spaces between the front and rear and intermediate bowed members, the said closing means in each space comprising plates, one of which is adapted to overlie the other and said overlying plate being provided with inwardly extending vertical flanges at its front and rear edges, the edges of which rest upon the flanges of opposing bowed members and the other of said plates being provided with bearing strips which rest upon the said flanges of said bowed members, the flanges upon the said overlying plate and the bearing strip upon the other of said plates being adapted to slide upon the flanges of the said bowed members so as to change the relative positions of the said plates to open or close the space adapted to be closed thereby.

2. In a cart or wagon cover, the combination of front and rear bowed supporting members constituting part of a frame structure, an intermediate bowed supporting member, said last mentioned member being about midway between the said front and rear members, a bowed member situated a short distance in rear of the said rear member, said member having an upwardly extending vertical flange upon its rear edge, a connecting bar extending transversely of and connected to each of the said members at or near the middles thereof, connecting members extending transversely of and connected to the opposite ends of all of the said bowed members, a plurality of movable plates for closing the spaces between the said front and rear bowed supporting members and the intermediate supporting member, stationary plates for closing the space between the said rear bowed supporting member and the bowed member in rear of the latter member and a plate having its upper edge bent to form a hook-like portion by means of which the said plate may be connected with and suspended from the said upwardly and vertically extending flange for closing the rear end of the said cover, substantially as described.

3. In a cart or wagon cover, the combination of front and rear channel members of bowed shape, a plurality of intermediate channel members of bowed shape, means for connecting the said channel members together back to back, the channels of the front and rear members facing each other and the channels of the intermediate members facing in opposite directions toward the front and rear of the cover, an angle member extending transversely of and connected to the said members at their middle portions, angle-irons extending transversely of and connected to the opposite end portions of the said members, gusset-plates provided at the points of certain of the connections between the said channel members and said angle-irons whereby the connections between the same are strengthened and means for connecting the said angle-irons to the opposite side portions of a cart or wagon body, substantially as described.

4. In a cart or wagon cover, the combination of front and rear bowed members respectively provided with rearwardly and forwardly extending flanges, an intermediate bowed supporting member provided with flanges respectively extending toward the front and rear of the cover, means for connecting the said bowed members together at their centers and at their opposite ends to form a frame structure, the opposite sides of the said frame structure being adapted to be secured to and supported upon the upper edge portions of the opposite sides of the body of a cart or wagon, means for closing and opening each of the spaces between the front and rear and intermediate bowed members, the said closing means in each space comprising plates supported at their front and rear edges upon the flanges of the end and intermediate bowed members, said plates being of curved shape in transverse section and being of a width slightly greater than half the width of the cover so that normally their upper inner edges overlap each other, the overlapping edge of the top plates each being provided with a strengthening and filling part secured upon the underneath side thereof and the said plates being slidable upon their supporting flanges whereby they may be moved to open either one side of the space covered thereby or portions of both sides, substantially as described.

In testimony that I claim the foregoing as my invention, I have hereunto signed my name this 21st day of August, A. D. 1917.

SAMUEL ROCHLIS.